(12) United States Patent
Wang et al.

(10) Patent No.: US 12,349,222 B2
(45) Date of Patent: Jul. 1, 2025

(54) METHODS, APPARATUS AND SYSTEMS FOR MULTI-ACCESS PROTOCOL DATA UNIT SESSIONS

(71) Applicant: InterDigital Patent Holdings, Inc., Wilmington, DE (US)

(72) Inventors: Guanzhou Wang, Brossard (CA); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 256 days.

(21) Appl. No.: 17/799,457

(22) PCT Filed: Feb. 15, 2021

(86) PCT No.: PCT/US2021/018117
§ 371 (c)(1),
(2) Date: Aug. 12, 2022

(87) PCT Pub. No.: WO2021/163665
PCT Pub. Date: Aug. 19, 2021

(65) Prior Publication Data
US 2023/0102655 A1 Mar. 30, 2023

Related U.S. Application Data

(60) Provisional application No. 62/975,814, filed on Feb. 13, 2020.

(51) Int. Cl.
*H04W 76/16* (2018.01)
(52) U.S. Cl.
CPC .................. *H04W 76/16* (2018.02)
(58) Field of Classification Search
CPC ..... H04W 76/00; H04W 76/10; H04W 76/11; H04W 76/12; H04W 76/15; H04W 76/16;
(Continued)

(56) References Cited

U.S. PATENT DOCUMENTS 11,627,622 B2  4/2023  Kumar et al.
11,729,854 B2  8/2023  Bharatia et al.
(Continued)

FOREIGN PATENT DOCUMENTS

WO  WO-2019011398 A1 *  1/2019  ........... H04L 45/302
WO  WO-2019161240 A1 *  8/2019  ........ H04W 36/0027
(Continued)

OTHER PUBLICATIONS

3rd Generation Partnership Project; Technical Specification Group Services and System Aspects;General Packet Radio Service (GPRS) enhancements for Evolved Universal Terrestrial Radio Access Network (E-UTRAN) access (Release 16); 3GPP TS 23.401 V16.5.0 (Dec. 2019); 436 pages.
(Continued)

*Primary Examiner* — Kevin D Mew
(74) *Attorney, Agent, or Firm* — Jamie T. Nguyen

(57) ABSTRACT

A wireless transmit/receive unit (WTRU) may establish a multi-access (MA) protocol data unit (PDU) in accordance with the examples described herein. The WTRU may establish a new packet data network (PDN) connection or identify a suitable existing PDN connection in an evolved packet core (EPC), establish a MA-PDU in a 5G core network (5GC), and associate the existing PDN with the MA-PDU. The WTRU may already have a MA-PDU session established in 5GC with both 3GGP access leg and non-3GPP access leg in 5GC, and the WTRU may replace the 3GGP access leg in 5GC with a suitable PDN connection in EPC. The WTRU may send a request for establishing a single-access PDU session in 5GC via non-3GPP access, and a 5GC network may upgrade a PDU session established for the WTRU to a MA-PDU with 3GGP access leg in EPC.

18 Claims, 14 Drawing Sheets

(58) Field of Classification Search
CPC ..... H04W 76/20; H04W 76/22; H04W 76/32; H04W 76/34; H04W 76/36; H04W 76/50
See application file for complete search history.

(56) References Cited

U.S. PATENT DOCUMENTS

| | | | |
|---|---|---|---|
| 11,792,761 B2 | 10/2023 | Zhu et al. | |
| 2019/0260811 A1* | 8/2019 | Kim | H04W 76/12 |
| 2019/0342800 A1* | 11/2019 | Sirotkin | H04W 36/02 |
| 2019/0394833 A1* | 12/2019 | Talebi Fard | H04W 68/005 |
| 2020/0236727 A1* | 7/2020 | Salkintzis | H04W 48/18 |
| 2020/0336940 A1 | 10/2020 | Salkintzis | |
| 2020/0404552 A1* | 12/2020 | Huang-Fu | H04W 36/0027 |
| 2021/0092664 A1* | 3/2021 | Lai | H04W 8/08 |
| 2021/0127442 A1 | 4/2021 | Tang | |
| 2021/0219140 A1 | 7/2021 | Salkintzis et al. | |
| 2021/0410010 A1 | 12/2021 | Salkintzis | |
| 2022/0248479 A1 | 8/2022 | Yu et al. | |
| 2022/0264370 A1 | 8/2022 | Qiao et al. | |
| 2022/0303854 A1 | 9/2022 | Salkintzis et al. | |
| 2022/0408397 A1 | 12/2022 | Zhu et al. | |

FOREIGN PATENT DOCUMENTS

| | | | | |
|---|---|---|---|---|
| WO | WO 2020014983 A1 | 1/2020 | | |
| WO | WO-2021224183 A1 * | 11/2021 | ......... | H04L 63/0272 |

OTHER PUBLICATIONS

Interdigital, Inc., "Replacing 3GPP access leg of MA-PDU Session with PDN connection in EPC", Tdoc S2-2004173, SA WG2 Meeting #139E, Jun. 1-12, 2020, E-meeting, 3 pages.

"3rd Generation Partnership Project; Technical Specification Group Services and System Aspects; System Architecture for the 5G System; Stage 2 (Release 16)",3GPP TS 23.501 vol. SA WG2, No. V16.3.0, Dec. 22, 2019 (Dec. 22, 2019), pp. 1-417.

Third Generation Partnership Project, "Technical Specification Group Services and System Aspects; Procedures for the 5G System (5GS); Stage 2 (Release 16)," 3GPP TS 23.502 V16.3.0 (Dec. 2019).

Mediatek iNC., "Discuss on ATSSS and Interworking with EPS", 3GPP Tdoc S2-1907346, SA WG2 Meeting #134, Jun. 24-28, 2019, Sapporo, Japan, 2 pages.

Ericsson, et al., "EPS interworking for MA PDU session of 5G-RG", 3GPP Tdoc C1-198712, 3GPP TSG-CT WG1 Meeting #121, Reno (NV), USA, Nov. 11-15, 2019, 3 pages.

* cited by examiner

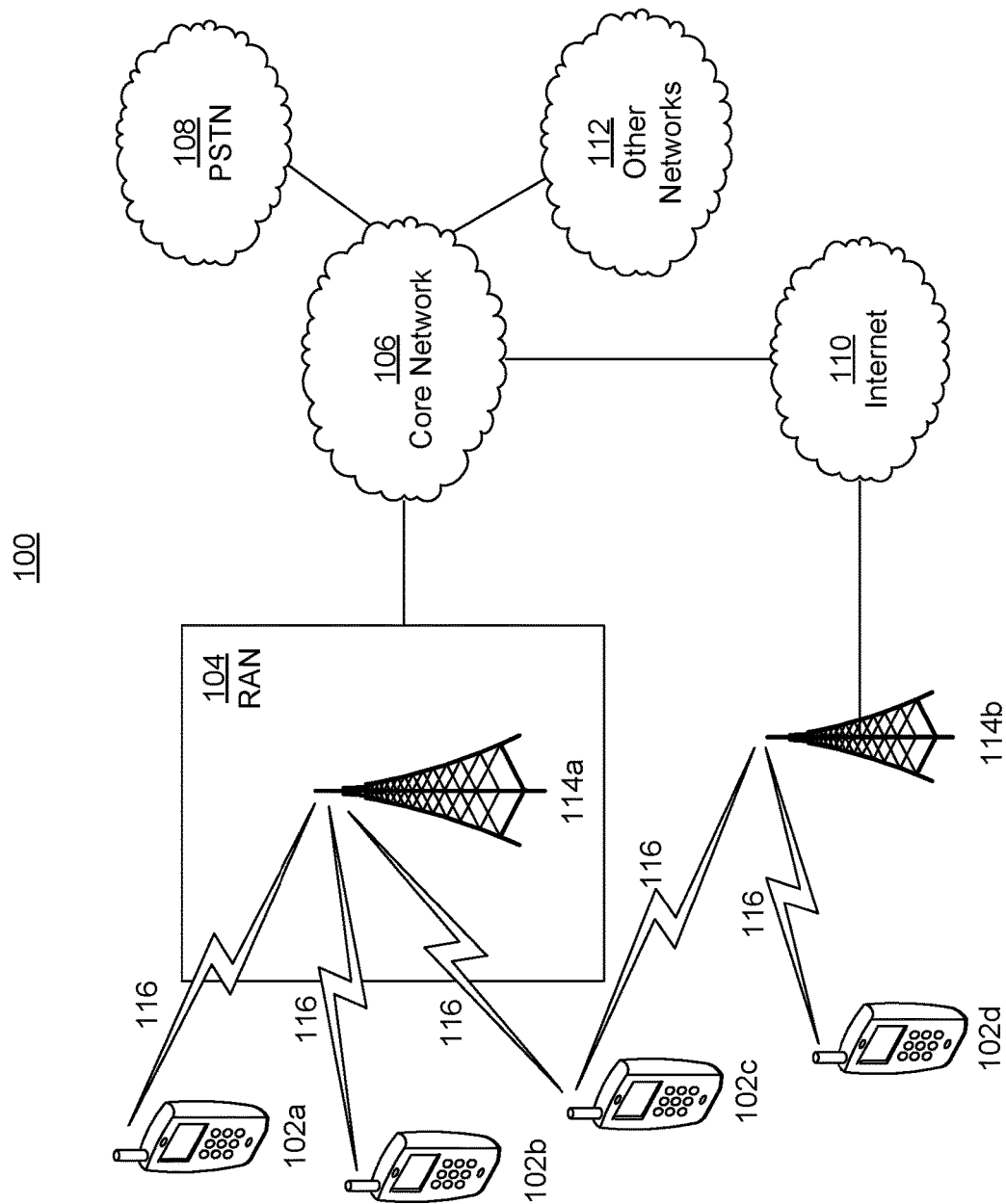

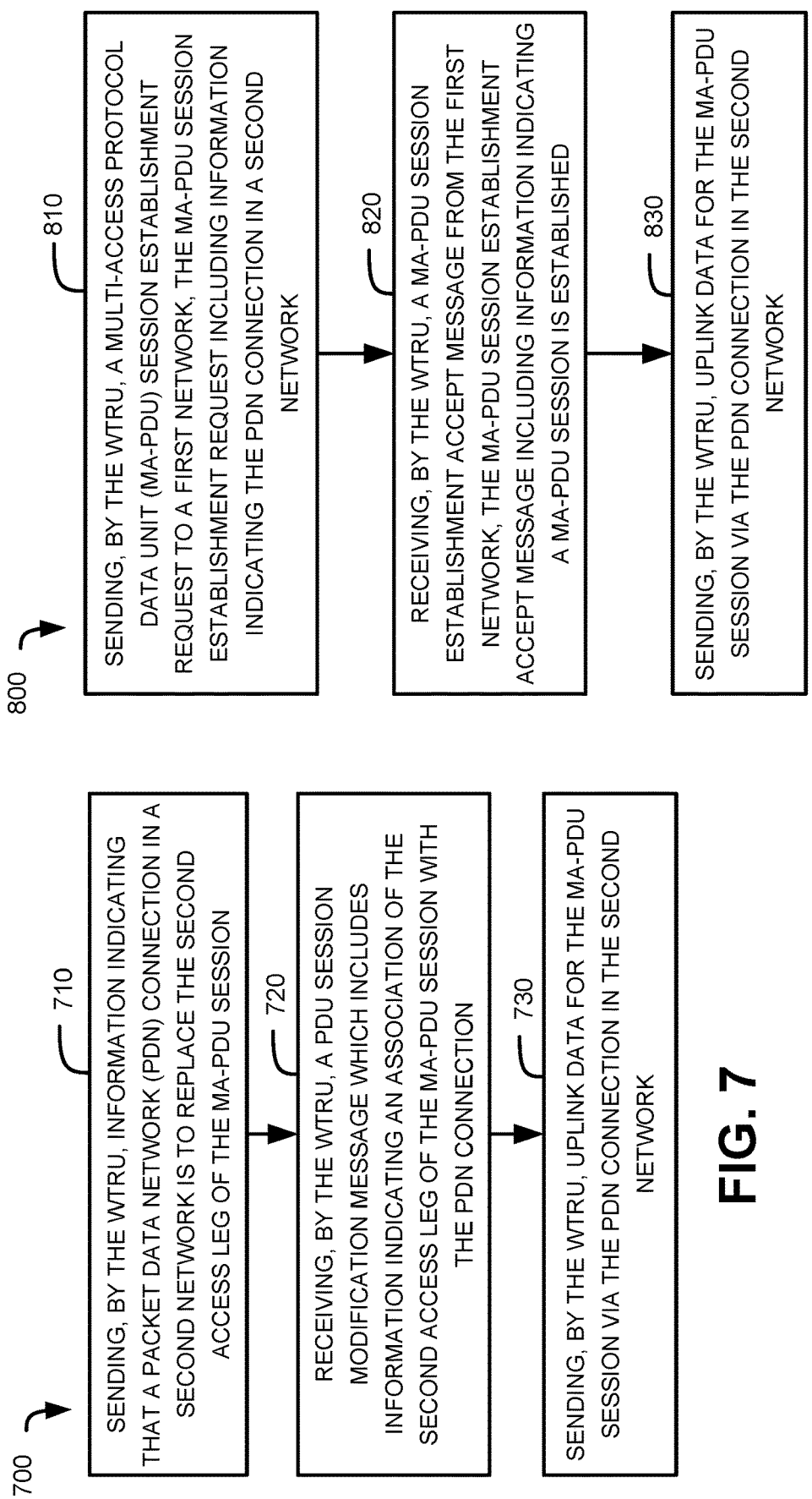

METHODS, APPARATUS AND SYSTEMS FOR MULTI-ACCESS PROTOCOL DATA UNIT SESSIONS

CROSS REFERENCE TO RELATED APPLICATION

This application is a U.S. National Stage Application under 35 U.S.C. § 371 of International Patent Application No. PCT/US2021/018117, filed Feb. 15, 2021, which claims the benefit of priority to U.S. Provisional Patent Application Ser. No. 62/975,814 filed Feb. 13, 2020, the contents thereof being incorporated by reference as if fully set forth herein.

FIELD

Embodiments disclosed herein generally relate to wireless communications and, for example to methods, apparatus and systems for multi-access protocol data unit (PDU) sessions.

RELATED ART

Mobile communications are in continuous evolution and are already at the doorstep of their fifth generation (5G). Certain networks can be implemented in which user equipment (UE) may access a long term evolution (LTE) network. Certain networks can be implemented in which user equipment (UE) may access a 5G network.

SUMMARY

It may be desirable for a wireless transmit/receive unit (WTRU) to be able to access more than one wireless network such as accessing both an LTE network and a 5G network. Described herein are systems, methods and instrumentalities for establishing a multi-access (MA) protocol data unit (PDU). Such a MA-PDU may be associated with multiple access networks including, for example, a 3GPP access network (e.g., 5G NR) and a non-3GPP access network (e.g., WLAN). A wireless transmit/receive unit (WTRU) that has established a MA-PDU may steer traffic towards the multiple networks and may switch or split the traffic among these networks. In examples, a WTRU may identify a suitable existing packet data network (PDN) connection in an evolved packet core (EPC), establish a MA-PDU in a 5G core network (5GC), and associate the existing PDU with the MA-PDU. In examples, a WTRU may already have a MA-PDU session established in the 5GC with both a 3GPP access leg and a non-3GPP access leg in the 5GC, and the WTRU may replace the 3GPP access leg in the 5GC with a suitable PDN connection in an EPC. In examples, a WTRU may send a request for establishing a single-access PDU session in a 5GC via non-3GPP access, and the 5GC network may upgrade a PDU session established for the WTRU to a MA-PDU with a 3GPP access leg in an EPC.

BRIEF DESCRIPTION OF THE DRAWINGS

FIG. 1A is a system diagram illustrating an example communications system in which one or more disclosed embodiments may be implemented.

FIG. 7 is a diagram illustrating a representative procedure that may be implemented by a WTRU to replace a 3GGP access leg of a MA-PDU session with a PDN connection.

FIG. 8 is a diagram illustrating a representative procedure that may be implemented by a WTRU to associate a PDN connection with a MA-PDU session.

DETAILED DESCRIPTION

Figure 1B:
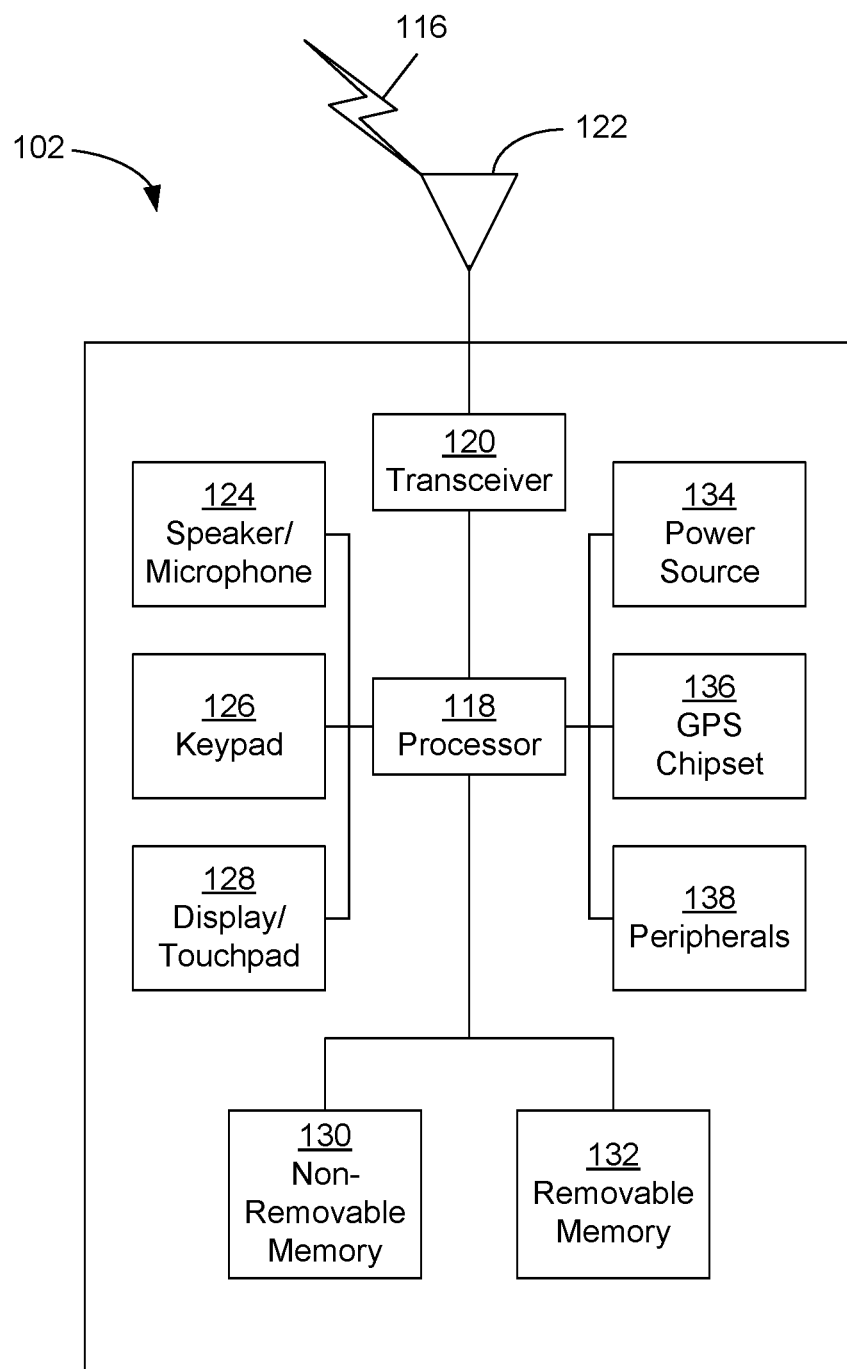
FIG. 1B is a system diagram illustrating an example wireless transmit/receive unit (WTRU) that may be used within the communications system illustrated in FIG. 1A according to an embodiment.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
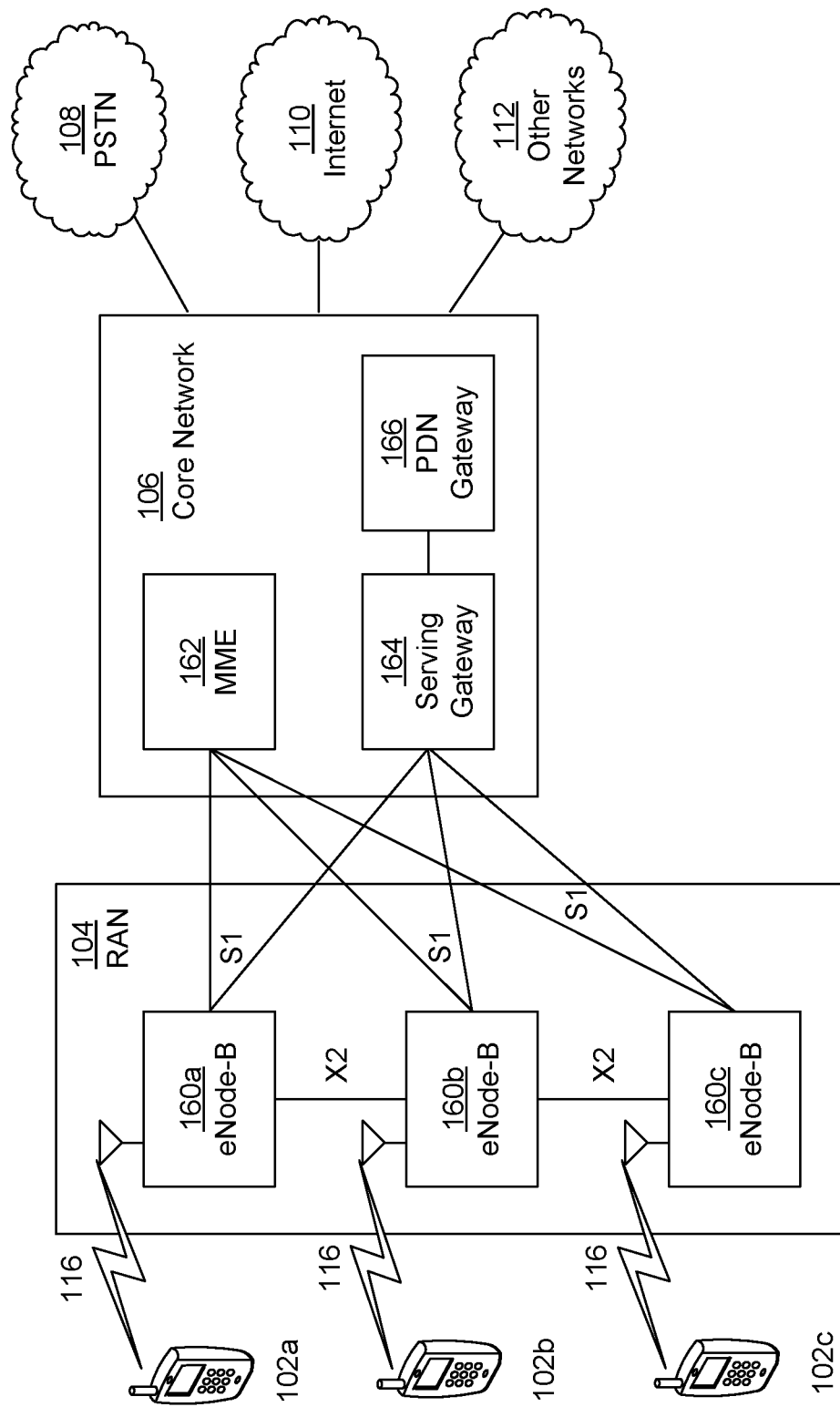
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 6 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
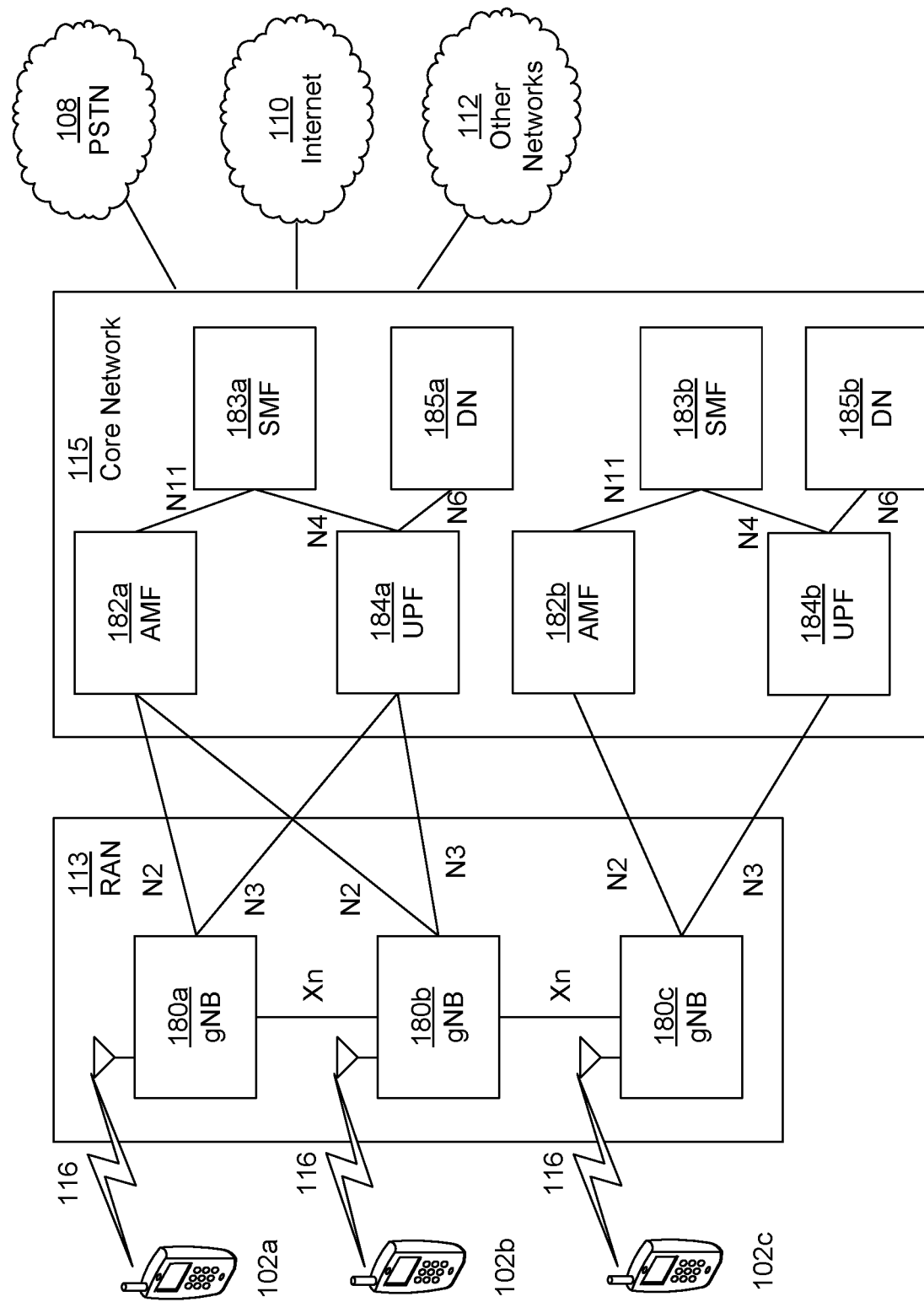
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
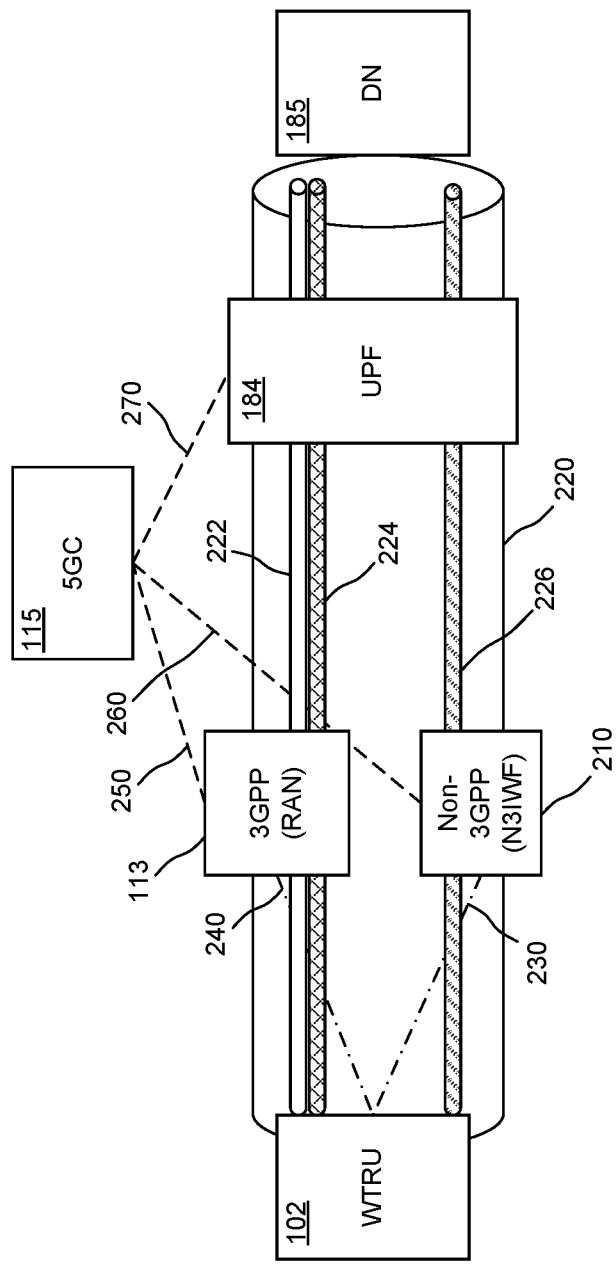
FIG. 2 is a diagram illustrating a MA-PDU session.

The following acronyms may be used in connection with the description provided herein.
3GPP 3rd Generation Partnership Project
5GC 5G Core network
AMF Access and Mobility Management Function
ATSSS Access Traffic Steering, Switching & Splitting
EPC Evolved Packet Core
EPS Evolved Packet System E-UTRAN Evolved Universal Terrestrial Radio Access Network
HSS Home Subscriber Server
MA-PDU Multi-Access PDU Session
MME Mobility Management Entity
N3IWF Non-3GPP InterWorking Function
NR New Radio
PCF Policy Control Function
PDU Protocol Data Unit
PDN Packet Data Network
PGW Serving Gateway
PGW-C PDN Gateway
SGW Serving Gateway
SMF Session Management Function
S-NSSAI Single Network Slice Selection Assistance Information
UDM Unified Data Management
URSP UE Route Selection Policy A multi-access PDU session (MA-PDU) may be a PDU session that is associated with multiple user plane connectivities including, for example, connectivity via a 3GPP access network (e.g., 5G NR) and connectivity via a non-3GPP access network (e.g. WLAN). A WTRU that has established a MA-PDU may steer application traffic towards a 3GGP access network and/or a non-3GPP access network. The WTRU may switch or split the traffic between the two access networks, e.g., according to the configured ATSSS rules. FIG. 2 provides an illustration of an example MA-PDU. A MA-PDU may be terminated in a 5G Core Network (5GC). For example, the user plane resources for a 3GPP access network and a non-3GPP access network may be terminated in a user plane function (UPF) in the 5GC.

As shown in FIG. 2, a WTRU 102 may access a 5GC network (herein otherwise referred to as "5GC") 115 using a non-3GPP access network (e.g., using a first radio technology) via a N3IWF 210. The WTRU 102 may access the 5GC 115 using a 3GPP access network (e.g., using a second radio technology) via a RAN 113 (or a RAN 104). A MA-PDU session 220 may be established with respect to the WTRU 102 and a network (e.g., a DN 185 such as shown in FIG. 1D or another network). The MA-PDU session 220 may carry multiple flows (e.g., traffic flows) 222, 224 and 226 to the 5GC 115. The UPF 184 may communicate these flows to the DN 185, such as over an N6 interface. For example, the MA-PDU session 220 may have a non-3GPP access 230 (e.g. via the N3IWF 210) and a 3GPP access 240 (e.g., via the RAN 113. The WTRU 102 may send one or more flows (e.g., flows 222 and 224) via a 3GPP access leg of the MA-PDU session 220 to the RAN 113 using a first radio access technology (e.g., 5G NR). The WTRU 102 may send one or more flows (e.g., flow 226) via a non-3GPP access leg of the MA-PDU session 220 to the N3IWF 210 using a second radio access technology (e.g., IEEE 802.11). The flows may have separate QoS requirements associated therewith.

The 5GC 115 may have respective connections 250, 260, 270 to the RAN 113, the N3IWF 260 and the UPF 184. For example, the N3IWF 210 may have an N2 interface to an AMF 182 of the 5GC 115.

Figure 3:
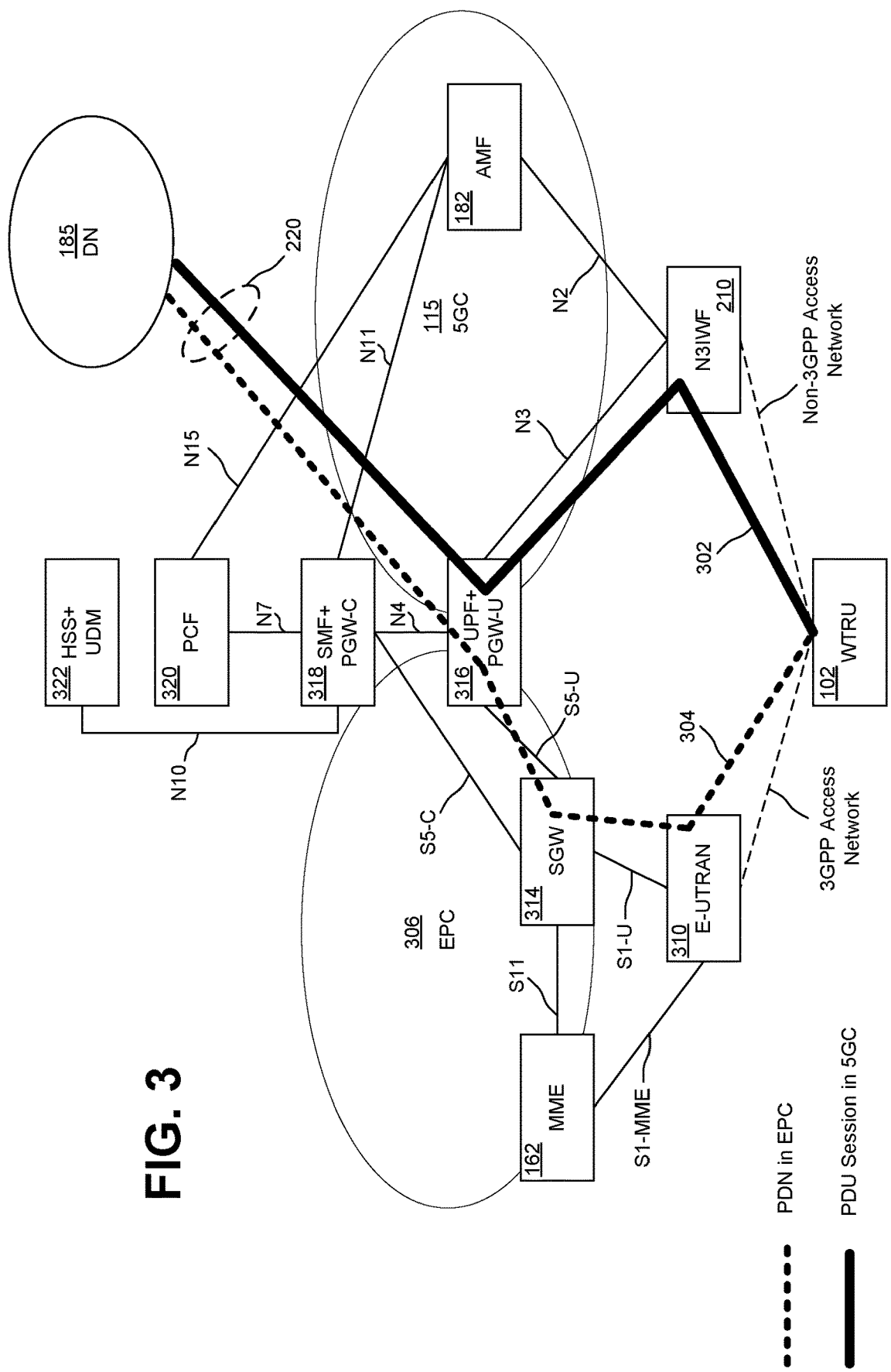
FIG. 3 is a diagram illustrating a MA-PDU session with both a 3GPP access leg in an EPC and a non-3GPP access leg in a 5GC.

In examples (e.g., during 5G network roll-out), 3GPP (e.g., a 5G NR network) access coverage may not be available or sufficient in certain areas such as inside a building, but a 4G access network (e.g., an LTE network connected to a 4G Core Network such as an EPC) and/or a non-3GPP access network (e.g., a non-3GPP access network connected to a 5G Core Network) may be in good operating conditions in those areas. A WTRU 102 may be able to benefit from the latter two access networks (e.g., LTE and non-3GPP access network) for traffic steering and/or switching, and a MA-PDU session 220 (e.g., which may have 3GPP access such as LTE in EPC and/or non-3GPP access in 5GC) may be supported. FIG. 3 illustrates an example MA-PDU session 220 with a PDN connection 304 in an EPC network (herein otherwise referred to as "EPC) 306 (e.g., via 3GPP LTE access) as one access leg and a PDU session 302 in a 5GC 115 (e.g., via non-3GPP access) as another access leg.

As shown in FIG. 3, a non-roaming architecture may be used for interworking between the 5GC 115 via non-3GPP access (e.g., a non-3GPP-access network 308) and the EPC 306 via 3GPP access (e.g., an E-UTRA network (E-UTRAN) 310). The WTRU 102 may use a first radio access technology for non-3GPP access via the N3IWF 210 to communicate with the 5GC 115. The WTRU 102 may use a second radio access technology for 3GPP access via the E-UTRAN 310 to communicate with the EPC 306. Such an architecture may support one or more MA-PDU sessions, such as the MA-PDU session 220 with a 3GPP access leg in the EPC 306 (e.g., an access leg may refer to the resources including user plane resources associated with accessing a network). The MA-PDU session 220 may be established with respect to the WTRU 102 and a DN 185 outside of the 5GC 115 as shown in FIG. 3 or a DN 185 or another network such as shown in FIG. 1D. For purposes of explanation, the UPF 184 and the DN 185 are shown separately from the 5GC 115 in FIG. 2. It should be understood that the UPF 184 and/or DN 185 may reside in the 5GC 115 as shown in FIG. 1D. As another example, the MA-PDU session 220 may have a DN 185 that resides outside of the 5GC 115 and/or the EPC 306 as shown in FIG. 3. These architectures may be used in the examples provided herein.

The EPC 306 may include an MME 162 and a SGW 314 which may be connected over an S11 interface. The MME 162 may be connected to the E-UTRAN 310 over an S1-MME interface. The SGW 314 may be connected to the E-UTRAN 310 over an S1-U interface. THE 5GC 115 may include an AMF 182 which may be connected to the N3IWF 210 over an N2 interface. A UPF and PGW for a user plane (UPF+PGW-U) 316 may be provided for the PDN connection 304 and the PDU session 302 to the data network (e.g., the MA-PDU session 220). The UPF+PGW 316 may be connected to the SGW 314 over an S5-U interface. The UPF+PGW 316 may be connected to the NWIWF 210 over an N3 interface. A SMF and PGW for a control plane (SMF+PGW-C) 818 may be connected to the SGW 314 over an S5-C interface. The SMF+PGW-C 818 may be connected to the AMF 182 over an N11 interface. The SMF+PGW-C 818 may be connected to the UPF+PGW-U 316 over an N4 interface. A PCF 320 may be connected to the AMF 182 by a N15 interface. The PCF 320 may be connected to the SMF+PGW-C 318 by a N7 interface. A HSS+UDM 322 may be connected to the SMF+PGW-C 318 by a N10 interface.

An MA-PDU session 220 with a 3GPP access leg may be established in the EPC 306. The MA-PDU session 220 may be associated with multiple (e.g., two) access network types (e.g., a RAN and WLAN) and/or multiple 3GGP core networks (e.g., EPC 306 and 5GC 115). A PDN connection 304 in the EPC 306 (e.g., via 3GGP access) and a PDU session 302 in the 5GC 115 (e.g., via non-3GPP access) may be established. The EPC PDN connection 304 and the 5G PDU session 302 may be associated with each other, for example, to provide traffic steering and/or traffic switching functionalities. Shared network entities between multiple (e.g., two) types of core networks, such as SMF+PGW-C, UPF+PGW-U and/or HSS+UDM, may make it possible for the core networks to handle the MA-PDU session 220 described herein as well as the related traffic steering and/or switching in the same network entities.

The following aspects may be considered in connection with establishing a MA-PDU session 220 as described herein. These aspects may include, for example, how a MA-PDU session 220 with a 3GGP access leg in the EPC 306 is triggered (e.g., how and/or when a WTRU 102 may determine to establish such a MA-PDU session 220), how and/or when a WTRU 102 establishes a new PDN connection 304 or identify a suitable existing PDN connection 304 in the EPC 306 for the MA-PDU session 220, how a WTRU 102 associates a PDN connection 304 with a PDU session 302 in the 5GC 115 and how the WTRU 102 implements traffic steering and/or switching functionalities on the PDN connection 304 and/or the PDU session 302, what the QoS requirements are for traffic flows that are coordinated between an EPC PDN connection 304 and a 5GC PDU session 302, etc.

With respect to the triggering of a MA-PDU session 220 with 3GGP access in the EPC 306, a WTRU 102 may determine whether such a MA-PDU session 220 with 3GGP access leg in the EPC 306 can be established. URSP rules may be configured (e.g., preconfigured) for the WTRU 102 and may include an indication for establishing a MA-PDU session 220. The URSP rules may indicate, for example, that 3GGP access in the EPC 306 is allowed for route selection descriptors that have an access type preference of multi-access. The URSP rules may indicate the respective priorities of using 3GGP access leg in the EPC 306 and in the 5GC 115 for the MA-PDU session 220. Default priorities may be specified. For example, when 3GGP access in the 5GC 115 is available, it may be given a higher priority than 3GGP access in the EPC 306 for establishing the MA-PDU session 220.

In examples (e.g., when a WTRU 102 reports that it supports MA-PDU sessions with a 3GGP access leg in the EPC 306, such as during a registration procedure), the network may update the URSP rules for a WTRU 102, for example, with the indications described herein. The update may be performed, for example, using a WTRU configuration update procedure (e.g., such as the UE Configuration Update procedure defined for 5G).

In examples (e.g., when a new PDU session is to be established for application traffic), a WTRU 102 may check one or more of the following criteria to determine whether a MA-PDU session 220 with 3GGP access in the EPC 306 may be established.

The WTRU 102 may check its registration status in the EPC 306 to determine whether a MA-PDU session 220 with 3GGP access in the EPC 306 may be established. The WTRU 102 may be registered in a 5GC 115 and an EPC 306 in order to be able to establish a MA-PDU session 220. As such, the WTRU 102 may be operating in a dual-registration mode. The WTRU 102 and/or the network may choose the dual-registration mode for 5GC-EPC interworking, for example, during 5GC registration and/or EPC tracking area update procedures (e.g., if the WTRU 102 reports a capability for supporting MA-PDU sessions with a 3GGP access leg in the EPC 306). In examples (e.g., when the WTRU 102 determines to establish a MA-PDU session 220 with 3GGP access leg in the EPC 306, and/or when an EPC/E-UTRAN network is available but the WTRU 102 has not registered with the EPC 306), the WTRU 102 may initiate an attach procedure with the EPC 306 first.

The WTRU 102 may check its own and/or the network's capabilities for supporting MA-PDU sessions with 3GGP access in the EPC 306 to determine whether a MA-PDU session 220 with 3GGP access in the EPC 306 may be established. The WTRU 102 may report its capabilities for supporting MA-PDU sessions with 3GGP access leg in the EPC 306. The reporting may be performed during a 5GC registration procedure and/or an EPC attach procedure. The network (e.g., the 5GC 115 and/or the EPC 306) may indicate (e.g., return to the WTRU 102) the network's capabilities for MA-PDU sessions. In examples, the WTRU 102 may establish a MA-PDU session 220 when (e.g., only when) the WTRU 102, the 5GC 115, and the EPC 306 have the capabilities to support MA-PDU sessions with 3GGP access in the EPC 306.

The WTRU 102 may determine whether a MA-PDU session 220 with 3GGP access in the EPC 306 can be established based on URSP rules (e.g., URSP rule indications). For example, the WTRU 102 may establish a MA-PDU session 220 when the route selection descriptor associated with triggering application traffic include an access type preference set as multi-access and/or when the URSP rules include an indication that 3GGP access leg in the EPC 306 is allowed. When multiple access types are available (e.g., when 3GGP access is available for both a 5GC 115 (e.g., NR) and a EPC 306 (e.g., E-UTRAN)), the WTRU 102 may check the priorities of the multiple access types. For example, if 3GGP access in the EPC 306 has a higher priority, the WTRU 102 may establish a MA-PDU session 220 with 3GGP access leg in the EPC 306.

A WTRU 102 may establish a MA-PDU session 220 with 3GGP access leg in the EPC 306 based on one or more of the following, for example, when all or a subset of the criteria described above are satisfied.

In examples, the WTRU 102 may identify a suitable PDN connection 304 in the EPC 306. The WTRU 102 may then establish a MA-PDU session 220 in the 5GC 115 and associate the existing PDU with the MA-PDU session 220. In examples, the WTRU 102 may already have a MA-PDU session 220 (e.g., a normal MA-PDU) session established in the 5GC 115, and the MA-PDU session 220 may have a 3GGP access leg and a non-3GPP access leg in the 5GC 115. The WTRU 102 may replace the 3GGP access leg in the 5GC 115 with a suitable PDN connection 304 in the EPC 306. In examples, the WTRU 102 may request (e.g., with a network) to establish an access PDU session 302 (e.g., a single access PDU session) in the 5GC 115 via non-3GPP access, and the 5GC 115 may decide to upgrade the requested PDU session 302 to a MA-PDU session 220 with a 3GGP access leg in the EPC 306.

With respect to associating a suitable PDN connection 304 in the EPC 306 with a 5GC MA-PDU session 220, a WTRU 102 may determine to establish a MA-PDU session 220 with 3GGP access leg in the EPC 306. The WTRU 102 may search among existing PDN connections to see if there is a suitable PDN connection 304 that meets one or more of the following criteria. One of the criteria may be whether the type of the PDN connection (e.g., IPv6, IPv4v6 or Ethernet) matches that of the MA-PDU session 220. One of the criteria may be whether an access point name (APN) of the PDN connection 304 corresponds to a data network name (DNN) of the MA-PDU session 220. One of the criteria may be whether the PDN connection 304 was established to support 5GC-EPC interworking and/or whether a PDU session ID has been allocated for the PDN connection 304. One of the criteria may be whether the S-NSSAI(s) that the WTRU 102 receives from a shared network entity (e.g., PGW-C+SMF) matches that of the MA-PDU session 220.

If a suitable PDN connection 304 is identified, the WTRU 102 may initiate a MA-PDU session establishment procedure via non-3GPP access in the 5GC 115. The WTRU 102 may perform one or more of the following during this procedure.

The WTRU 102 may indicate in a PDU session establishment request that a 3GGP access leg is available in the EPC/E-UTRAN. As such, the network may skip establishing user plane resources over the 3GGP access of the 5GC 115.

The WTRU 102 may use the PDU session ID allocated for a PDN connection 304 as the PDU session ID of the MA-PDU session 220 and set a request type to indicate that it is associated with an existing PDU session 302.

The WTRU 102 may provide the APN of the PDN connection 304 in the PDU session establishment request. The 5GC 115 may use the APN to locate a shared network entity (e.g., PGW-C+SMF) that may be serving the PDN connection 304 and select the same entity (e.g., same PGW-C+SMF) for the MA-PDU session 220.

The WTRU 102 may provide the IP address of the PDN connection 304 (e.g., to the network) and the network may use the same IP address for the MA-PDU session 220.

In response to the MA-PDU session 220 being successfully established, the WTRU 102 may maintain one or more identifiers of the PDN connection 304 (e.g., the EPS bearer ID (EBI) of a default bearer in the PDN connection, the APN, etc.), for example, in the WTRU's local session context of the MA-PDU session 220. The WTRU 102 may mark in the context that the 3GGP access leg of this MA-PDU session 220 points to the PDN connection 304.

During a traffic steering or switching process (e.g., when ATSSS rule evaluation results point to or indicate 3GGP access), a WTRU 102 may send data over an associated PDN connection 304 in the EPC 306.

Figure 4:
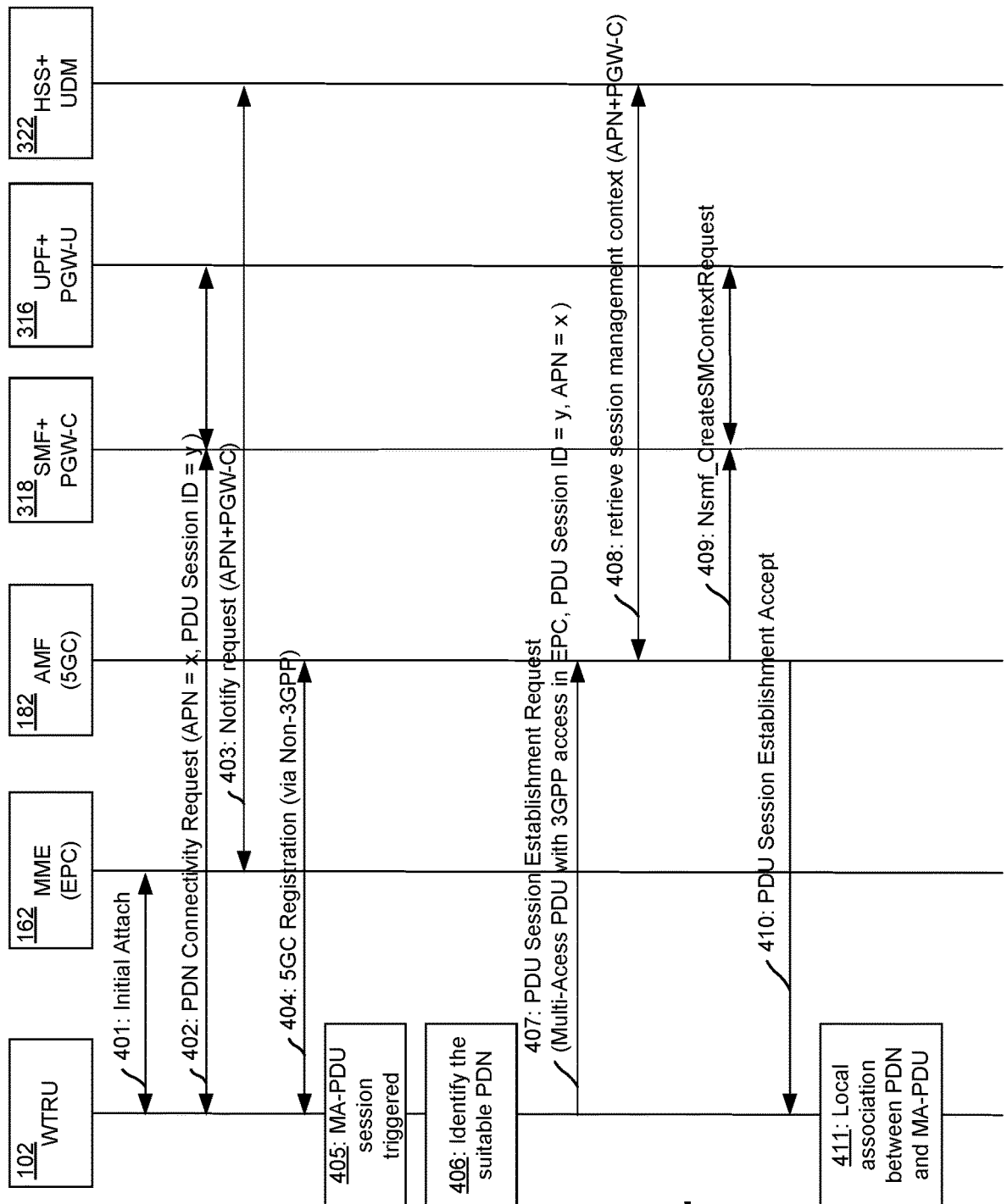
FIG. 4 is a diagram illustrating example operations that may be performed to associate a PDN connection with a MA-PDU session.

FIG. 4 illustrates example high-level operations that may be performed by a WTRU 102 and/or a network in accordance with the examples described herein.

At 401, a WTRU 102 (e.g., a dual-registration mode WTRU) may perform an attach procedure (e.g., an initial attach procedure) with an EPC 306 (e.g., the MME 162) and/or may indicate (e.g., to the EPC 306 such as the MME 162) that the WTRU 102 is moving from the 5GC 115. At 402, the WTRU 102 may establish a PDN connection 304 (e.g., with a network entity such as the SMF+PGW-C 318) in an EPC 306 that supports 5GC-EPC interworking. The WTRU 102 may be allocated a PDU session ID for this PDN connection 304 and may provide the PDU session ID to the network (e.g., a network entity such as the SMF+PGW-C 318). At 403 (e.g., after the PDN connection 304 has been successfully established), the MME 162 may notify the HSS+UDM 322 of the APN+PGW-C pair (e.g., the APN identifier and the PDU session identifier) that corresponds to the PDN connection. At 404, the WTRU 102 may register with the 5GC 115 (e.g., via non-3GPP access). The WTRU 102 may perform a registration procedure with the AMF 182. The WTRU 102 and the 5GC 115 may exchange information regarding their capabilities for supporting MA-PDU sessions with 3GGP access in the EPC 306.

At 405, MA-PDU session establishment may be triggered in the WTRU 102 (e.g., the WTRU 102 may allow or prefer a 3GGP access leg in the EPC 306). At 406, the WTRU 102 may search among existing (e.g., any existing) PDN connections and identify a suitable PDN connection that matches a desired MA-PDU session 220, e.g., according to the criteria described herein.

At 407, the WTRU 102 may initiate (e.g., send) a PDU session establishment request message over non-3GPP access (e.g., a non-3GPP access network) with an indication of multi-access and/or an indication that the 3GGP access leg is in the EPC 306. The WTRU 102 may provide (e.g., to the network) the PDU session ID allocated for the suitable PDN connection 304, the DNN that corresponds to the APN of the PDN connection 304, and/or the APN itself.

At 408, the AMF may retrieve the session manage context from the HSS+UDM. The context may include the APN and PGW-C addresses (e.g., as a pair). The AMF may be able to locate the same PGW-C+SMF that serves the PDN connection 304, e.g., by comparing the APN received from the WTRU 102 and the APN+PGW-C pairs received from the HSS+UDM.

At 409, the AMF may invoke the SMF service to create the PDU session (e.g. MA-PDU session 220) and/or its user plane resources. The SMF may understand that a 3GGP access leg is already established in the EPC 306. The SMF may establish (e.g., only establish) user plane resources over non-3GGP access in the 5GC 115.

At 410, the WTRU 102 may receive a PDU session establishment accept message. The message may confirm that the MA-PDU session 220 has been successfully set up. The WTRU 102 may receive ATSSS rules and/or QoS rules in the message.

At 411, the WTRU 102 may associate (e.g., locally associate) the PDN connection 304 with the MA-DPU session context. Data may be sent over the PDN connection 304, e.g., when the execution of the ATSSS rules points to the 3GGP access.

With respect to replacing a 3GGP access leg in a 5GC MA-PDU session 220 with a suitable PDN connection 304, it may be assumed that a WTRU 102 is registered with the 5GC 115 and/or has established a normal MA-PDU session (e.g., a MA-PDU session with a 3GGP access leg and a non-3GPP access leg in the 5GC 115). In examples (e.g., when the 3GGP access in the 5GC 115 is lost), the WTRU 102 may establish a PDN connection 304 that corresponds to the 5GC 3GGP access leg of the MA-PDU session 220. The WTRU 102 may (e.g., alternatively) identify an existing suitable PDN connection 304 as described herein. The WTRU 102 may replace the 3GGP access leg of the MA-PDU session 220 with the new PDN connection 304.

The WTRU 102 may establish a PDN connection 304 in the EPC 306 that corresponds to the original 3GGP access leg (in the 5GC 115) of the MA-PDU session 220. The WTRU 102 may perform one or more of the following.

The WTRU 102 may indicate, e.g., in a PDN connectivity request to the EPC 306, that the PDN connection 304 is part of a MA-PDU session 220.

After the PDN connection 304 is established, the network may understand that the PDN connection 304 is used as a leg of a MA-PDU session 220 and may not release the corresponding PDU session 302 in the 5GC 115.

After the PDN connection 304 is successfully established, the WTRU 102 may perform a PDU session modification procedure to inform the 5GC 115 that it should associate the PDN connection 304 with the MA-PDU session 220. One or more of the following may take place during the PDU session modification procedure. The WTRU 102 may indicate that the purpose of the PDU session modification is to replace the 3GGP access leg with a PDN connection 304. The WTRU 102 may provide the APN of the PDN connection 304 to the 5GC 115. The 5GC network may associate the PDN connection 304 to the MA-PDU session 220 (e.g., if the modification procedure is successful).

Figure 5:
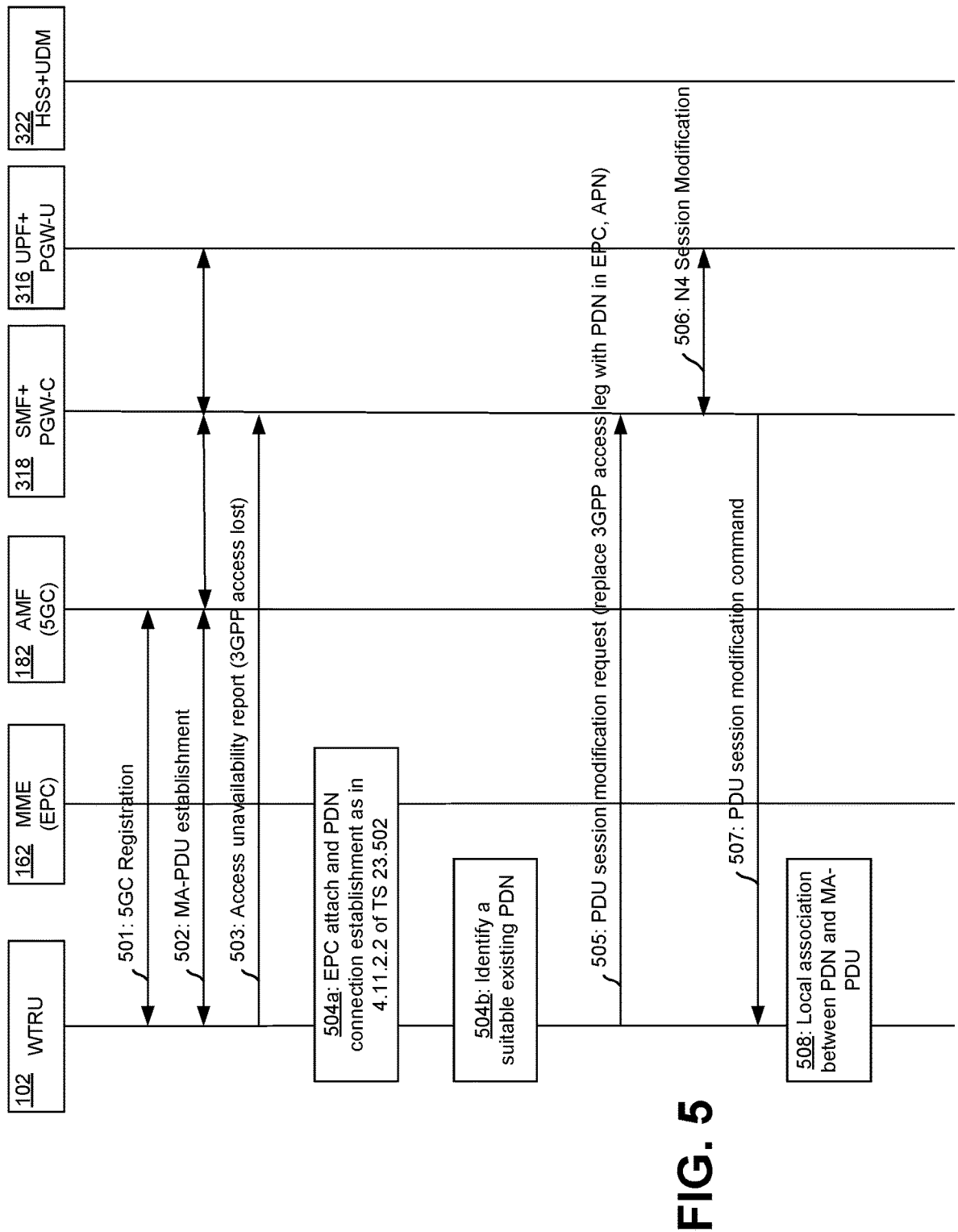
FIG. 5 is a diagram illustrating example operations that may be performed to replace the 3GPP access leg of a MA-PDU session with a PDN connection.

FIG. 5 illustrates example high-level operations that may be performed by a WTRU 102 and/or a network in accordance with the examples described herein.

At 501, a WTRU 102 (e.g., a dual-registration mode WTRU) may register with a 5GC 115. At 502, the WTRU 102 may establish a MA-PDU session 220 (e.g., a normal MA-PDU session) in the 5GC 115 with a 3GGP access leg and a non-3GPP access leg in the 5GC 115. At 503, the WTRU 102 may detect that it has lost the 3GGP access leg (e.g., NR) and may report the unavailability of the 3GGP access to a network.

At 504a, the WTRU 102 may perform attach and PDN connectivity establishment in the EPC 306 (e.g., if the WTRU 102 supports MA-PDU sessions with a 3GGP access leg in the EPC 306). The WTRU 102 may provide the PDU session ID of the MA-PDU session 220 to the EPC 306. At 504b (e.g., if the WTRU 102 has already established a suitable PDN connection 304 in the EPC 306), the WTRU 102 may identify such a suitable existing PDN connection 304 as described herein.

At 505 (e.g., after a suitable PDN connection is established or identified), the WTRU 102 may initiate a PDU session modification procedure with the 5GC 115. The WTRU 102 may indicate in a request that the 3GGP access leg of the MA-PDU session 220 may be replaced by the PDN connection 304 in the EPC 306. The WTRU 102 may provide the APN of the PDN connection 304 to the 5GC 115.

At 506, the SMF may modify the DL traffic forwarding rules in the UPF. The traffic that is supposed to be forwarded on the 3GGP access may be sent on the PDN connection 304. At 507, the WTRU 102 may receive a PDU modification command from the network. At 508, the WTRU 102 may associate (e.g., locally associate) the PDN connection 304 with the MA-DPU session context. Data may be sent over the PDN connection 304, for example, when the execution of the ATSSS rules points to the 3GGP access.

With respect to a network upgrading a single-access PDU request to a MA-PDU session 220 with 3GGP access in the EPC 306, a WTRU 102 may request the single-access PDU session 302 in the 5GC 115 via non-3GPP access. The WTRU 102 may indicate (e.g., to the network) its capabilities for supporting MA-PDU sessions with 3GGP access in the EPC 306. The 5GC 115 may decide to modify the PDU session 302 to a MA-PDU session 220. The 5GC 115 may indicate in a PDU session accept message that the PDU Session 302 has been upgraded to MA-PDU session 220 (e.g., by including one or more ATSSS rules in the message). The 5GC 115 may (e.g., additionally) indicate that the 3GGP access leg in the EPC 306 is allowed for the MA-PDU session 220.

The WTRU 102 may initiate, e.g., in response to receiving an indication that a 3GGP access leg in the EPC 306 is allowed, an attach and/or PDN connectivity request procedure to establish a suitable PDN corresponding to the MA-PDU session 220. The WTRU 102 may identify, e.g., in response to receiving an indication that a 3GGP access leg in the EPC 306 is allowed, an existing suitable PDN connection 304 and utilize the PDU session modification procedure to inform the network that it should associate the PDN connection 304 with the MA-PDU session 220 (e.g., in manners described herein).

Figure 6:
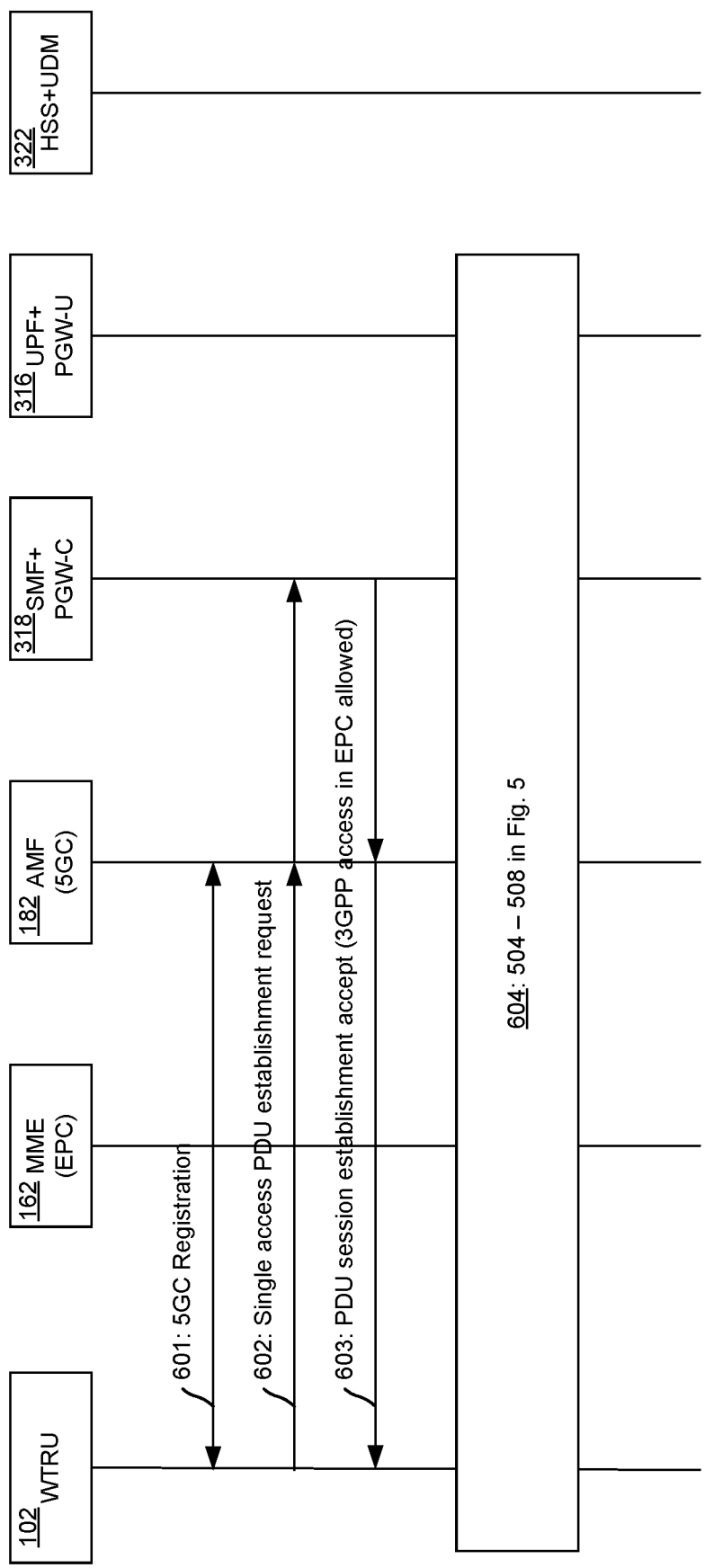
FIG. 6 is a diagram illustrating example operations that may be performed to upgrade a single-access PDU session to a MA-PDU with 3GPP access in an EPC.

FIG. 6 illustrates example high-level operations that may be performed by a WTRU 102 and/or a network in accordance with the examples described herein. At 601, a WTUR (e.g., a dual-registration mode WTRU) may register with a 5GC 115. At 602, the WTRU 102 may submit a single-access PDU establishment request. At 603, the network may upgrade the single-access PDU session 302 to a MA-PDU session 220 with 3GGP access in the EPC 306 and may send a PDU session establishment accept message to the WTRU 102 indicating that the PDU session 302 has been upgraded to a MA-PDU session and/or that 3GGP access in the EPC 306 is allowed. At 604, operations similar to those depicted at 504-508 of FIG. 5 may be performed.

FIG. 7 is a diagram illustrating a representative procedure that may be implemented by a WTRU 102 to replace a 3GGP access leg of a MA-PDU session 220 with a PDN connection 304. As shown in FIG. 7, the procedure 700 may be implemented by the WTRU 102 to manage a MA-PDU session 220 which includes a first access leg in a first network and a second access leg in the first network. At 710, the WTRU 102 may perform sending of information indicating that a PDN connection 304 (e.g., a new PDN connection or an existing PDN connection) in a second network is to replace the second access leg (e.g., in the first network) of the MA-PDU session 220. For example, the SMF+PGW-C 318 and the UPF+PGW-U 316 may perform an N4 session modification. DL traffic rules may be modified so that traffic is forwarded (e.g., sent) on the PDN connection 304 which replaces the 3GGP access leg. At 720, the WTRU 102 may perform receiving of information indicating an association of the second access leg of the MA-PDU session 220 with the PDN connection 304 in the second network. For example, the association of the of the second access leg of the MA-PDU session 220 with the PDN connection 304 may inform the WTRU 102 that SMF+PGW-C 318 has modified the traffic rules for the MA-PDU session. At 730, the WTRU 102 may perform sending of uplink data for the MA-PDU session 220 (e.g., to a data network destination) via the PDN connection 304 in the second network. In addition to or in the alternative, the WTRU 102 may perform receiving of downlink data for the MA-PDU session 220 (e.g., from the data network destination) via the PDN connection 304 in the second network.

In certain representative embodiments, the MA-PDU session 220 may have, prior to replacement of the second access leg with the PDN connection 304, a non-3GPP access leg and a 3GGP access leg in the 5GC 115. The WTRU 102 may use a first radio access technology to communicate over the non-3GPP access leg (e.g., via the N3IWF) in a first network (e.g., the 5GC) and may use a second radio access technology to communicate over the 3GGP access leg (e.g., via a gNB) in the first network (e.g., the 5GC).

In certain representative embodiments, the WTRU 102 may perform a procedure (e.g., request) to establish the MA-PDU session 220 with the first network (e.g., the 5GC). For example, the WTRU 102 may send a PDU session establishment request to establish the MA-PDU session 220 prior to sending information which indicates that the PDN connection 304 in the second network is to replace an access leg (e.g., 3GGP access leg) of the MA-PDU session 220. The information which indicates that the PDN connection 304 in the second network is to replace the access leg of the MA-PDU session 220 may be transmitted via the N3IWF to the first network (e.g., the 5GC).

In certain representative embodiments, the WTRU 102 may perform a procedure (e.g., request) to establish the PDN connection 304 with the second network (e.g., the EPC). For example, the WTRU 102 may send a request to establish the PDN connection 304 prior to sending information which indicates that the PDN connection 304 in the second network is to replace an access leg (e.g., 3GGP access leg) of the MA-PDU session 220. As another example, the WTRU 102 may send a request to establish the PDN connection 304

(e.g., a PDN connectivity request) and the request may include the information which indicates that the PDN connection 304 in the second network is to replace an access leg (e.g., 3GGP access leg) of the MA-PDU session 220. The request to establish the PDN connection 304 may include a PDU session identifier for the MA-PDU session 220, an identifier of an APN associated with the MA-PDU session 220 and/or an identifier of the DNN associated with the APN.

In certain representative embodiments, the WTRU 102 may perform communications using the modified MA-PDU session 220. For example, the WTRU 102 may transmit uplink data using the non-3GGP access leg, the PDN connection 304 which replaced the 3GGP access leg, or both. The WTRU 102 may determine the transmission path (e.g., non-3GPP access leg and/or PDN connection 304) based on any of an ATSSS rule(s) and/or a QoS rule(s). As another example, the WTRU 102 may receive downlink data using the non-3GPP access leg, the PDN connection 304 which replaced the 3GGP access leg, or both.

FIG. 8 is a diagram illustrating a representative procedure that may be implemented by a WTRU 102 to associate a PDN connection 304 with a MA-PDU session 220. As shown in FIG. 8, the procedure 800 may be implemented by the WTRU 102. At 810, the WTRU 102 may perform sending of a MA-PDU session establishment request to a first network. The MA-PDU session establishment request may include information indicating a PDN connection 304 in a second network. At 820, the WTRU 102 may perform receiving of a PDU session establishment accept message from the first network. The PDU session establishment accept message may include information indicating the MA-PDU session 220 is established. At 830, the WTRU 102 may perform the WTRU 102 may perform sending of uplink data for the MA-PDU session 220 (e.g., to a data network destination) via the PDN connection 304 in the second network. In addition to or in the alternative, the WTRU 102 may perform receiving of downlink data for the MA-PDU session 220 (e.g., from the data network destination) via the PDN connection 304 in the second network.

In certain representative embodiments, the MA-PDU session 220 may have a non-3GPP access leg in the 5GC 115 and a 3GGP access leg in the EPC 306. The WTRU 102 may use a first radio access technology to communicate (e.g., via the N3IWF 210) over the non-3GPP access leg and may use a second radio access technology to communicate (e.g., via a E-UTRAN 310) over the 3GGP access leg.

In certain representative embodiments, the WTRU 102 may perform a procedure (e.g., request) to establish the MA-PDU session 220 with the first network (e.g., the 5GC 115). For example, the WTRU 102 may send a PDU session establishment request to establish the MA-PDU session 220. The PDU session establishment request may include information which indicates any of the MA-PDU session 220 has 3GGP access to the EPC 306, an identifier (e.g., PDU session identifier) of the PDN connection 304, an identifier of an APN associated with the MA-PDU session 220 and/or an identifier of the DNN associated with the APN.

In certain representative embodiments, the WTRU 102 may perform a procedure (e.g., request) to establish the PDN connection 304 with the second network (e.g., the EPC). For example, the WTRU 102 may send a request (e.g., PDN connectivity request) to establish the PDN connection 304 prior to performing the procedure (e.g., request) to establish the MA-PDU session 220 with the first network (e.g., the 5GC). In response to the request, the WTRU 102 may receive a PDU session identifier and/or an APN identifier as shown at 402 in FIG. 4.

In certain representative embodiments, the WTRU 102 may perform communications using the MA-PDU session 220 (e.g., after receiving the PDU session accept message). For example, the WTRU 102 may transmit uplink data using a non-3GPP access leg, the PDN connection 304, or both. The WTRU 102 may determine the transmission path (e.g., non-3GPP access leg and/or PDN connection 304) based on any of an ATSSS rule(s) and/or a QoS rule(s). As another example, the WTRU 102 may receive downlink data using the non-3GPP access leg, the PDN connection 304, or both.

Figure 9:
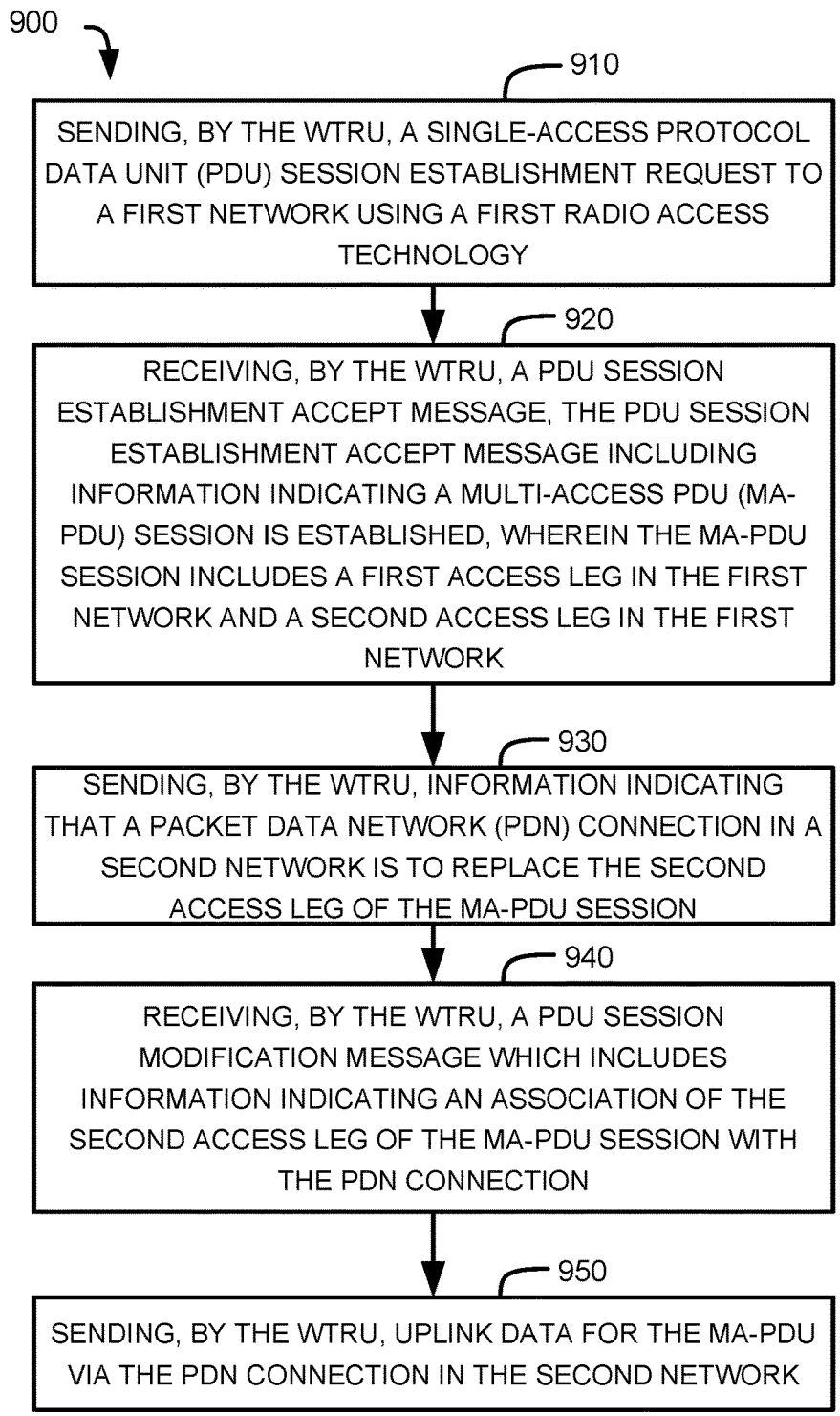
FIG. 9 is a diagram illustrating a representative procedure that may be implemented by a WTRU to upgrade a single-access PDU session to a MA-PDU session with a 3GPP access leg in an EPC.

FIG. 9 is a diagram illustrating a representative procedure that may be implemented by a WTRU 102 to upgrade a single-access PDU session to a MA-PDU session 220 with a 3GGP access leg in an EPC. As shown in FIG. 9, the procedure 900 may be implemented by the WTRU 102. At 910, the WTRU 102 may perform sending of a single-access PDU session establishment request to a first network using a first radio access technology. At 920, the WTRU 102 may perform receiving of a PDU session establishment accept message. The PDU session establishment accept message may include information indicating that a MA-PDU session 220 is established. The MA-PDU session 220 may include a first access leg and a second access leg. The first access leg and the second access leg may be in a first network (e.g., the 5GC 115). At 930, the WTRU 102 may perform sending of information indicating that a PDN connection 304 in a second network is to replace the second access leg (e.g., in the first network) of the MA-PDU session 220. At 940, the WTRU 102 may perform receiving of a PDU session modification message. The PDU session modification message may include information indicating an association of the second access leg of the MA-PDU session 220 with the PDN connection 304. At 950, the WTRU 102 may perform sending of uplink data for the MA-PDU session 220 (e.g., to a data network destination) via the PDN connection 304 in the second network. In addition to or in the alternative, the WTRU 102 may perform receiving of downlink data for the MA-PDU session 220 (e.g., from the data network destination) via the PDN connection 304 in the second network.

In certain representative embodiments, the MA-PDU session 220 may have a non-3GPP access leg in the 5GC 115 and a 3GGP access leg in the EPC 306. The WTRU 102 may use a first radio access technology to communicate (e.g., via the N3IWF 210) over the non-3GPP access leg and may use a second radio access technology to communicate (e.g., via a E-UTRAN 310) over the 3GGP access leg.

In certain representative embodiments, the WTRU 102 may perform a procedure (e.g., request) to establish the MA-PDU session 220 with the first network (e.g., the 5GC). For example, the WTRU 102 may send a single-access PDU session establishment request and may receive the PDU session establishment message indicating the establishment of the MA-PDU session 220 prior to sending information which indicates that the PDN connection 304 in the second network is to replace an access leg (e.g., 3GGP access leg) of the MA-PDU session 220. The information which indicates that the PDN connection 304 in the second network is to replace the access leg of the MA-PDU session 220 may be transmitted via the N3IWF to the first network (e.g., the 5GC).

In certain representative embodiments, the WTRU 102 may perform a procedure (e.g., request) to establish the PDN connection 304 with the second network (e.g., the EPC). For example, the WTRU 102 may send a request to establish the PDN connection 304 prior to sending information which indicates that the PDN connection 304 in the second network is to replace an access leg (e.g., 3GGP access leg) of the MA-PDU session 220. As another example, the WTRU 102 may send a request to establish the PDN connection 304 (e.g., a PDN connectivity request) and the request may include the information which indicates that the PDN connection 304 in the second network is to replace an access leg (e.g., 3GGP access leg) of the MA-PDU session 220. The request to establish the PDN connection 304 may include a PDU session identifier for the MA-PDU session 220, an identifier of an APN associated with the MA-PDU session 220 and/or an identifier of the DNN associated with the APN.

In certain representative embodiments, the WTRU 102 may perform communications using the modified MA-PDU session 220. For example, the WTRU 102 may transmit uplink data using the non-3GGP access leg, the PDN connection 304 which replaced the 3GGP access leg, or both. The WTRU 102 may determine the transmission path (e.g., non-3GPP access leg and/or PDN connection 304) based on any of an ATSSS rule(s) and/or a QoS rule(s). As another example, the WTRU 102 may receive downlink data using the non-3GPP access leg, the PDN connection 304 which replaced the 3GGP access leg, or both.

Figure 10:
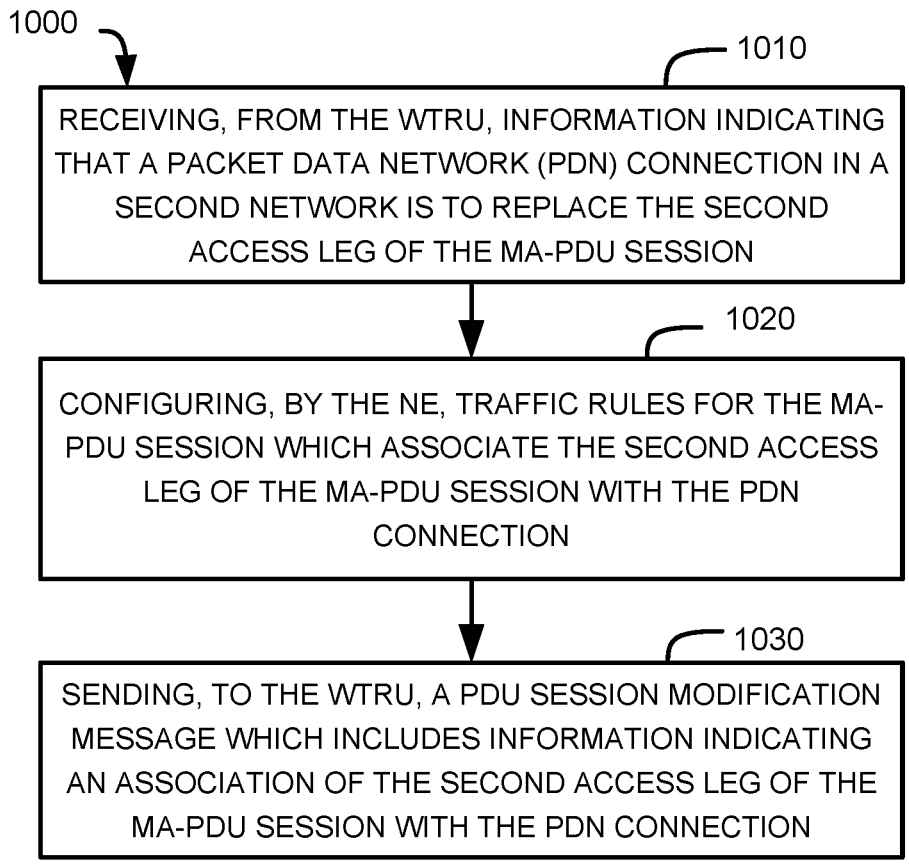
FIG. 10 is a diagram illustrating a representative procedure that may be implemented by a network entity (NE) to replace a 3GPP access leg of a MA-PDU session with a PDN connection.

FIG. 10 is a diagram illustrating a representative procedure that may be implemented by a network entity (NE) to replace a 3GGP access leg of a MA-PDU session with a PDN connection. As shown in FIG. 10, the procedure 1000 may be implemented by a NE (e.g., an SMF 183 and/or an SMF+PGW-C 318) which may be in communication with a WTRU 102. At 1010, the NE may receive, from the WTRU 102, information indicating that a packet data network (PDN) connection 304 (e.g., a new PDN connection or an existing PDN connection) in a network (e.g., the EPC 306) is to replace the second (e.g., 3GGP) access leg of a MA-PDU session 220. At 1020, the NE may proceed to configure traffic rules for the MA-PDU session 220 which associate the second access leg of the MA-PDU session 220 with the PDN connection 304. For example, the SMF+PGW-C 318 and the UPF+PGW-U 316 may perform an N4 session modification. For example, the configuring (e.g., reconfiguring) may modify the traffic forwarding rules (e.g., DL forwarding rules) in the UPF. The traffic that is to be forwarded on the 3GGP access leg may be sent on the PDN connection 304. At 1030, the NE may proceed to send, to the WTRU 102, a PDU session modification message. The PDU session modification message may include information indicating an association of the second access leg of the MA-PDU session 220 with the PDN connection 304. For example, the information in the PDU Session Modification message may inform the WTRU 102 that data (e.g., uplink data) may be sent for the MA-PDU session 220 over the associated PDN connection 304 in the EPC 306. The WTRU 102 may associate (e.g., locally associate) the PDN connection 304 with the MA-DPU session context. Data may be sent over the PDN connection 304, for example, when the execution of the ATSSS rules points to the 3GGP access.

Figure 11:
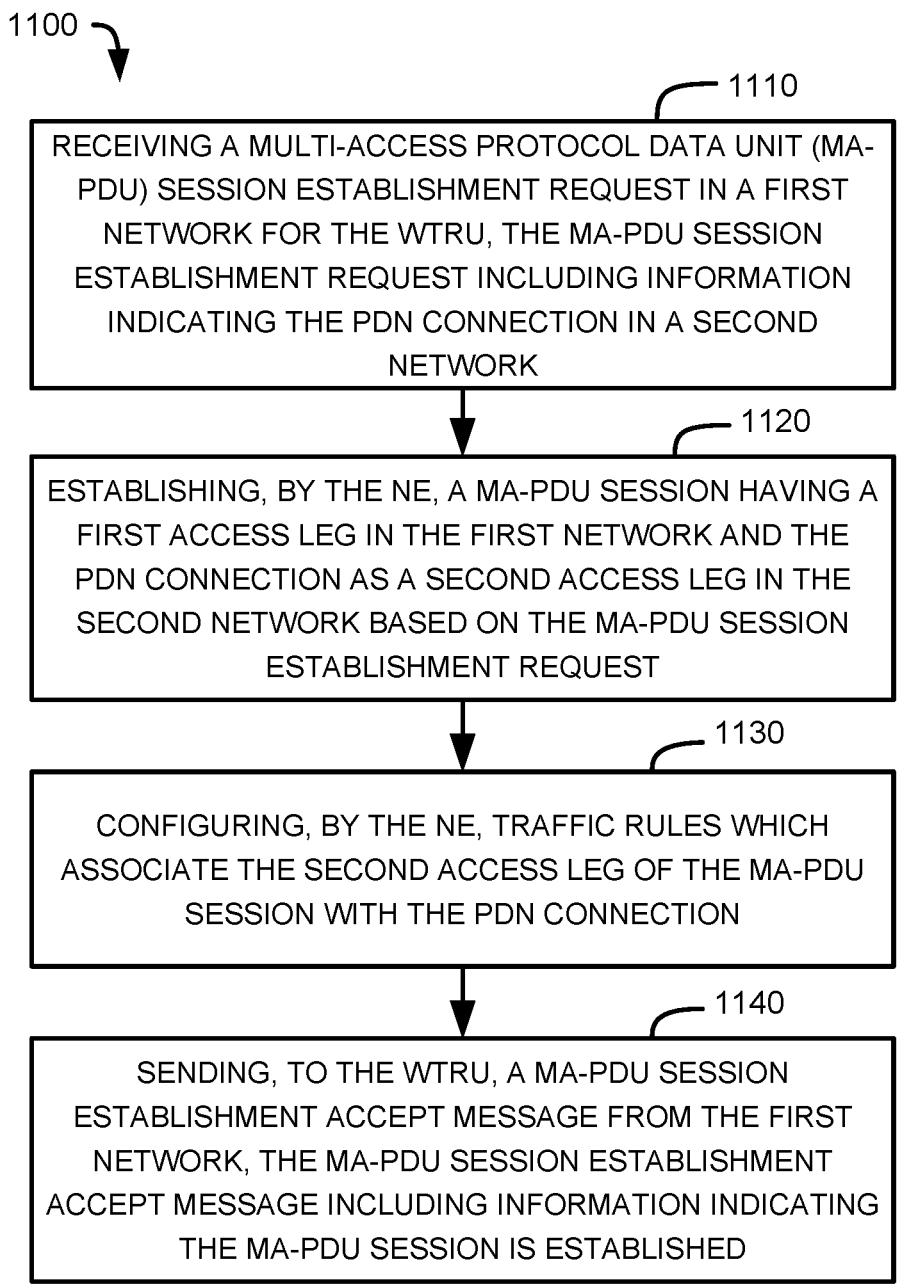
FIG. 11 is a diagram illustrating a representative procedure that may be implemented by a NE to associate a PDN connection with a MA-PDU session.

FIG. 11 is a diagram illustrating a representative procedure that may be implemented by a NE to associate a PDN connection with a MA-PDU session. As shown in FIG. 11, the procedure 1100 may be implemented by a NE (e.g., an SMF 183 and/or an SMF+PGW-C 318) which may be in communication with a WTRU 102. At 1110, the NE may receive a multi-access protocol data unit (MA-PDU) session establishment request in a first network (e.g., the 5GC 115) for the WTRU. The MA-PDU session establishment request may include information indicating a PDN connection 304 in a second network (e.g., the EPC 306). At 1120, the NE may proceed to establish a MA-PDU session having a first access leg in the first network and the PDN connection 304 (as a second access leg) in the second network based on the MA-PDU session establishment request. At 1130, the NE may proceed to configure traffic rules which associate the second access leg of the MA-PDU session 220 with the PDN connection 304. For example, the SMF+PGW-C 318 and the UPF+PGW-U 316 may perform an N4 session modification. For example, the configuring (e.g., reconfiguring) may modify the traffic forwarding rules (e.g., DL forwarding rules) in the UPF. The traffic that is to be forwarded on the 3GGP access leg may be sent on the PDN connection 304. At 1140, the NE may proceed to send, to the WTRU 102, a MA-PDU session establishment accept message (e.g., from the first network). The MA-PDU session establishment accept message may include information indicating the MA-PDU session is established. For example, the information in the MA-PDU session establishment accept message may inform the WTRU 102 that data (e.g., uplink data) may be sent for the MA-PDU session 220 over the associated PDN connection 304 in the EPC 306. The WTRU 102 may associate (e.g., locally associate) the PDN connection 304 with the MA-DPU session context. Data may be sent over the PDN connection 304, for example, when the execution of the ATSSS rules points to the 3GGP access.

Figure 12:
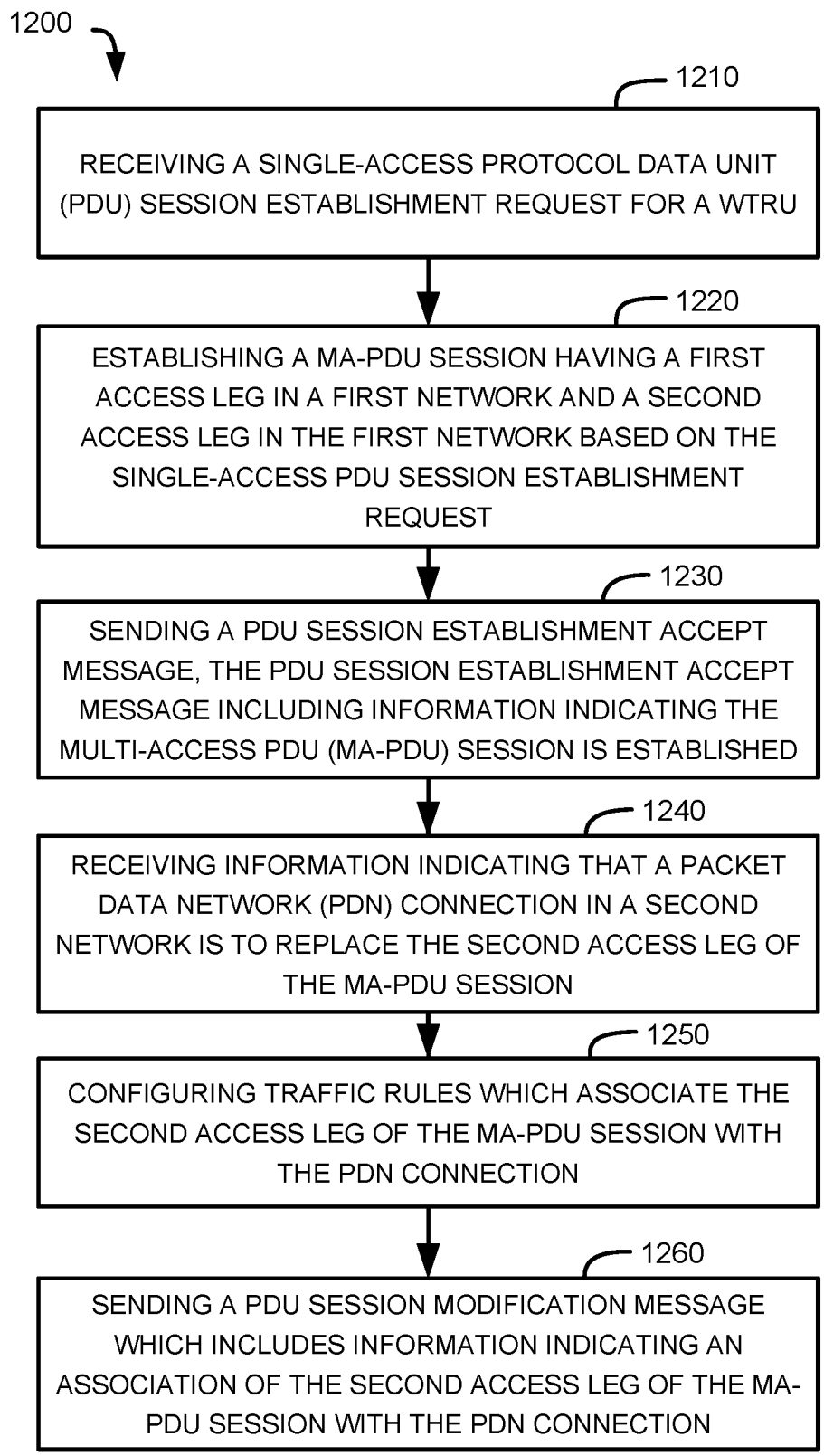
FIG. 12 is a diagram illustrating a representative procedure that may be implemented by a NE to upgrade a single-access PDU session to a MA-PDU session with a 3GGP access leg in an EPC.

FIG. 12 is a diagram illustrating a representative procedure that may be implemented by a NE to upgrade a single-access PDU session to a MA-PDU session with a 3GGP access leg in an EPC. As shown in FIG. 12, the procedure 1200 may be implemented by a NE (e.g., an SMF 183 and/or an SMF+PGW-C 318) which may in communication with a WTRU 102. At 1210, the NE may receive a single-access protocol data unit (PDU) session establishment request for a WTRU 102. At 1220, the NE may proceed to establish a MA-PDU session in a having a first access leg in a first network (e.g., the 5GC 115) and a second access leg in the first network based on the single-access PDU session establishment request. At 1230, the NE may proceed to send a PDU session establishment accept message (e.g., to the WTRU 102). The PDU session establishment accept message may include information indicating the MA-PDU session 220 is established. At 1240, the NE may receive information indicating that a PDN connection 304 in a second network (e.g., the EPC 306) is to replace the second access leg of the MA-PDU session 220. At 1250, the NE may configure traffic rules which associate the second access leg of the MA-PDU session 220 with the PDN connection 304. For example, the SMF+PGW-C 318 and the UPF+PGW-U 316 may perform an N4 session modification. For example, the configuring (e.g., reconfiguring) may modify the traffic forwarding rules (e.g., DL forwarding rules) in the UPF. The traffic that is to be forwarded on the 3GGP access leg may be sent on the PDN connection 304. At 1260, the NE may send a PDU session modification message (e.g., to the WTRU 102) and the PDU session modification message may include information indicating an association of the second access leg of the MA-PDU session 220 with the PDN connection 304. For example, the information in the PDU Session Modification message may inform the WTRU 102 that data (e.g., uplink data) may be sent for the MA-PDU session 220 over the associated PDN connection 304 in the EPC 306. The WTRU 102 may associate (e.g., locally associate) the PDN connection 304 with the MA-DPU session context. Data may be sent over the PDN connection 304, for example, when the execution of the ATSSS rules points to the 3GGP access.

Although the features and elements of the present disclosure may consider New Radio (NR) or 5G specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method implemented by a wireless transmit/receive unit (WTRU) to manage an established multi-access protocol data unit (MA-PDU) session, including a non-third generation partnership project (non-3GPP) access leg to a 5G core (5GC) network and a 3GPP access leg to the 5GC network, the method comprising:
sending, by the WTRU, information indicating (1) a request to establish a packet data network (PDN) connection to an evolved packet core (EPC) network and (2) the PDN connection is to replace the 3GPP access leg to the 5GC of the MA-PDU session;
receiving, by the WTRU, information indicating an association of the 3GPP access leg of the MA-PDU session with the PDN connection; and
communicating, by the WTRU, data for the MA-PDU session via (1) the non-3GPP access leg to the 5GC network and (2) the PDN connection to the EPC network.

2. The method of claim 1, further comprising: communicating, prior to the sending of the request to establish the PDN connection to the EPC network, communicating data for the MA-PDU session via (1) the non-3GPP access leg to the 5GC network using a first radio access technology and the 3GPP access leg to the 5GC using a second radio access technology.

3. The method of claim 1, further comprising:
establishing the MA-PDU session with the non-3GPP access leg to the 5GC network and the 3GPP access leg to the 5GC network prior to the sending of the information indicating (1) the request to establish the PDN connection to the EPC network and (2) the PDN connection is to replace the 3GPP access leg of the MA-PDU session.

4. The method of claim 1,
wherein the information indicating (1) the request to establish the PDN connection to the EPC network and (2) the PDN connection is to replace the 3GPP access leg of the MA-PDU session are included in a PDN connectivity request.

5. The method of claim 1, wherein the information indicates (1) the request to establish the PDN connection to the EPC network and (2) the PDN connection is to replace the 3GPP access leg to the 5GC of the MA-PDU session, and (3) an identifier of the MA-PDU session.

6. The method of claim 1, wherein the communicating, by the WTRU, the data for the MA-PDU session via (1) via the non-3GPP access leg to the 5GC network and (2) the PDN connection to the EPC network includes:
sending, by the WTRU, uplink data for the MA-PDU session via the PDN connection to the EPC network.

7. The method of claim 6, further comprising:
determining, by the WTRU, the data for the MA-PDU session is to be sent via the PDN connection based on one or more configured rules.

8. The method of claim 7, wherein the one or more configured rules include any of at least one access traffic steering, switching and splitting (ATSSS) rule and/or at least one quality of service (QOS) rule.

9. The method of claim 1, wherein the communicating, by the WTRU, the data for the MA-PDU session via (1) via the non-3GPP access leg to the 5GC network and (2) the PDN connection to the EPC network includes:
receiving, by the WTRU, downlink data for the MA-PDU session via the PDN connection to the EPC network.

10. A wireless transmit/receive unit (WTRU) which is configured to manage an established multi-access protocol data unit (MA-PDU) session including a non-third generation partnership project (non-3GPP) access leg to a 5G core (5GC) network and a 3GPP access leg to the 5GC network, the WTRU comprising:
a processor and transceiver which are configured to:
send information indicating (1) a request to establish a packet data network (PDN) connection to an evolved packet core (EPC) network and (2) the PDN connection is to replace the 3GPP access leg to the 5GC of the MA-PDU session,
receive information indicating an association of the 3GPP access leg of the MA-PDU session with the PDN connection, and
communicate data for the MA-PDU session via (1) the non-3GPP access leg to the 5GC network and (2) the PDN connection to the EPC network.

11. The WTRU of claim 10, wherein processor and the transceiver are configured to communicate, prior to the sending of the request to establish the PDN connection to the EPC network, communicating data for the MA-PDU session via (1) the non-3GPP access leg to the 5GC network using a first radio access technology and the 3GPP access leg to the 5GC using a second radio access technology.

12. The WTRU of claim 10, wherein the processor and the transceiver are configured to:
establish the MA-PDU session with the non-3GPP access leg to the 5GC network and the 3GPP access leg to the 5GC network prior to the sending of the information indicating (1) the request to establish the PDN connection to the EPC network and (2) the PDN connection is to replace the 3GPP access leg of the MA-PDU session.

13. The WTRU of claim 10, wherein the information indicating (1) the request to establish the PDN connection to the EPC network and (2) the PDN connection is to replace the 3GPP access leg of the MA-PDU session are included in a PDN connectivity request.

14. The WTRU of claim 10, wherein the information indicates (1) the request to establish the PDN connection to the EPC network and (2) the PDN connection is to replace the 3GPP access leg to the 5GC of the MA-PDU session, and (3) an identifier of the MA-PDU session.

15. The WTRU of claim 10, wherein the processor and the transceiver are configured to:
communicate, by the WTRU, the data for the MA-PDU session via (1) via the non-3GPP access leg to the 5GC network and (2) the PDN connection to the EPC network including to:
send, by the WTRU, uplink data for the MA-PDU session via the PDN connection to the EPC network.

16. The WTRU of claim 10, wherein the processor and the transceiver are configured to:
determine, by the WTRU, the data for the MA-PDU session is to be sent via the PDN connection based on one or more configured rules.

17. The WTRU of claim 16, wherein the one or more configured rules include any of at least one access traffic steering, switching and splitting (ATSSS) rule and/or at least one quality of service (QOS) rule.

18. The WTRU of claim 10, wherein the processor and the transceiver are further configured to:

communicate, by the WTRU, the data for the MA-PDU session via (1) via the non-3GPP access leg to the 5GC network and (2) the PDN connection to the EPC network including to:
receive, by the WTRU, downlink data for the MA-PDU session via the PDN connection to the EPC network.

* * * * *